(12) United States Patent
Visser

(10) Patent No.: US 8,016,314 B2
(45) Date of Patent: Sep. 13, 2011

(54) ELECTRONICALLY CONTROLLED TOW HITCH ASSEMBLY

(76) Inventor: Dirk Visser, Woodstock, GA (US)

( * ) Notice: Subject to any disclaimer, the term of this patent is extended or adjusted under 35 U.S.C. 154(b) by 294 days.

(21) Appl. No.: 12/414,909

(22) Filed: Mar. 31, 2009

(65) Prior Publication Data

US 2010/0109286 A1   May 6, 2010

Related U.S. Application Data

(60) Provisional application No. 61/110,647, filed on Nov. 3, 2008.

(51) Int. Cl.
*B60D 1/06* (2006.01)
(52) U.S. Cl. ......... 280/511; 280/507; 280/514; 280/515
(58) Field of Classification Search ................. 280/511, 280/507, 514, 515
See application file for complete search history.

(56) References Cited

U.S. PATENT DOCUMENTS

| | | | |
|---|---|---|---|
| 7,413,211 B2 * | 8/2008 | Hendry et al. | 280/491.2 |
| 7,889,062 B1 * | 2/2011 | Albisa | 340/431 |
| 2003/0075900 A1 * | 4/2003 | Kleb et al. | 280/491.3 |
| 2007/0290483 A1 * | 12/2007 | Visser | 280/507 |
| 2008/0073874 A1 * | 3/2008 | Riehle et al. | 280/511 |

* cited by examiner

*Primary Examiner* — Paul N Dickson
*Assistant Examiner* — Marlon A Arce
(74) *Attorney, Agent, or Firm* — Thomas, Kayden, Horstemeyer & Risley, LLP.

(57) ABSTRACT

An electronically controlled tow hitch assembly for a vehicle is provided which has a controller for locking and unlocking the assembly. The assembly has a locking unit with a receiving aperture into which a connector attached to a flange for holding a load or trailer is inserted. The locking unit has a locking shaft that extends through the aperture of the unit and passes through a groove in the wall of the aperture and an aligned groove in the connector for locking. An electric motor with a reduction gearbox is utilized to lock and unlock the connector from the locking unit. A spring loaded safety pin is used for locking the locking shaft with the tip of the safety pin entering the aperture and locking the locking shaft in position. The locking unit has an activation switch that determines when the connector has been fully inserted into the unit.

20 Claims, 2 Drawing Sheets

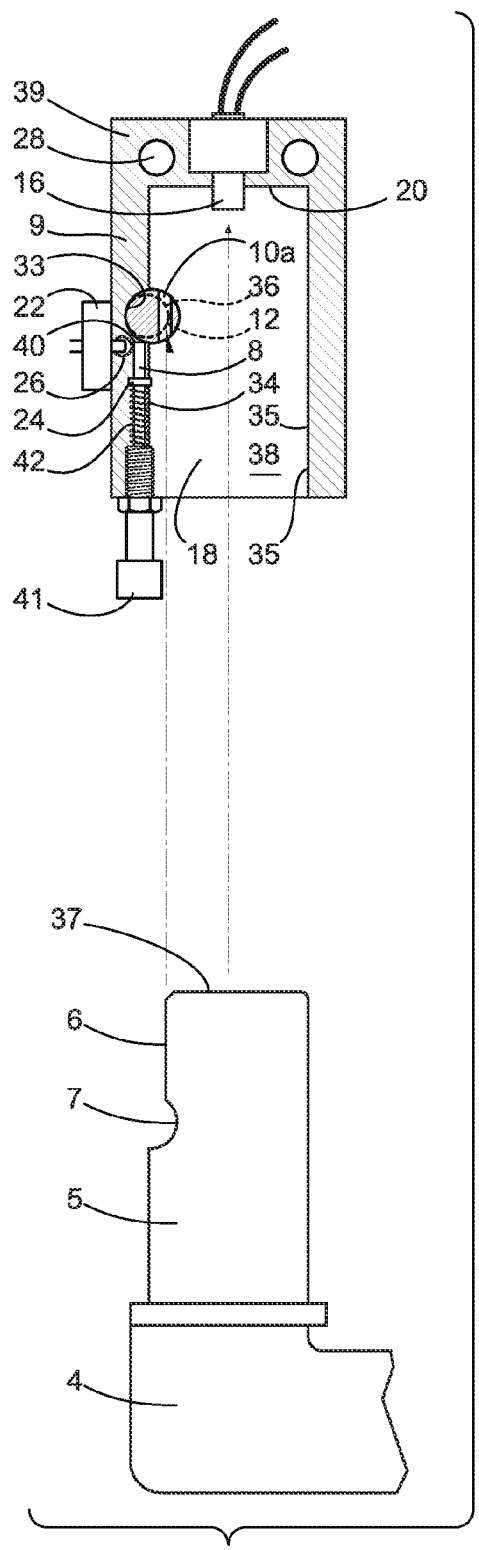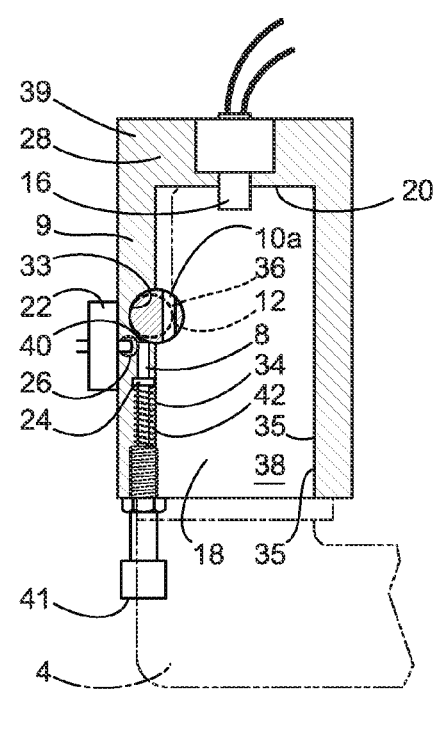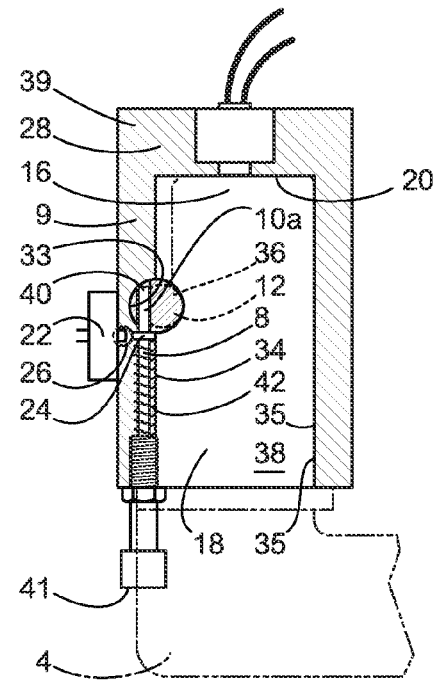
FIG. 2
FIG. 3
FIG. 4

ELECTRONICALLY CONTROLLED TOW HITCH ASSEMBLY

CROSS-REFERENCE TO RELATED APPLICATION

This application claims priority to corresponding U.S. provisional application entitled, "Electronically Controlled Tow Hitch Assembly," having Ser. No. 61/110,647, filed Nov. 3, 2008, which is entirely incorporated herein by reference.

FIELD OF THE INVENTION

This invention relates to an electronically controlled tow hitch assembly for use with motor vehicles. This electronically controlled tow hitch assembly can be electronically connected and disconnected from the vehicle to improve safety and ease in performing these operations.

BACKGROUND OF THE INVENTION

Tow hitches such as those fitted on motor vehicles and the like normally include a hitch receiver which is secured to the vehicle and which includes a ball mount and towball. A ball mount is securable to the receiver and a hitch ball is in turn securable to the ball mount.

A problem with conventional tow hitches is that for various reasons the ball mount and the receiver are removably secured to each other. This creates the possibility of easy removal of the flange, which makes it possible for thieves to remove the flange and hitch ball, which is secured to it. In some instances it also leads to theft of a ball mount, hitch ball and a trailer coupled to the hitch ball.

A further problem with conventional tow hitches is that the assembly of the tow hitch is difficult due to misalignment of the flange and receiver. For these items to be connected they need to be aligned perfectly and when connected still has a lot of play.

OBJECT OF THE INVENTION

It is the object of the present invention to provide means whereby there is automatic control of the securing and release of assemblies of the kind referred to and to eliminate any play of the towball.

SUMMARY OF THE INVENTION

According to this invention there is provided a tow hitch assembly comprising a locking unit adapted to receive a connector forming part of a ball mount having a protection plate or face spaced apart from the connector, the locking unit including a rotatable locking shaft to engage and release the connector and means for rotating the locking shaft through a gearbox mounted on the locking unit. The connector is received in an aperture in the locking unit, which has a transverse groove in a wall of the aperture.

Further features of this invention provides for an input shaft of the gearbox to be driven by an electric motor, which in turn drives the locking shaft to lock and unlock it. Unlocking the connector from the locking unit permits the removal of the connector from the locking unit. The locking shaft has an eccentric section with a cam to engage and be released from a transverse locking groove in the connector.

The invention also provides for a spring-loaded safety pin mounted in the locking unit to project there-from and having an end to engage in a recess or aperture in the locking shaft to limit the rotation of that shaft. The connector is preferably a circular post with a flat surface extending from its free end terminating in a transverse groove to be engaged and released by a cam on the locking shaft.

Still further features of the invention provide for maximum engagement of the cam to lock the connector to the locking unit and allow engagement of a safety pin in the locking shaft.

Another feature of the invention provides for the connection of the electrical wiring of the trailer to the towing vehicle to be a plug adapted to be releasably engaged to the locking unit.

The invention also provides for the electric motor to be controlled by a computer central processing unit (CPU) or controller programmed to monitor proper engagement and release of the connector in the locking unit and for the monitoring to include motor current or amperage measurements and motor operation timing as well as the engagement and release of the safety pin. The motor is activated by an activation switch when the connector has been inserted into the locking unit a sufficient distance, which is at or near the top of the aperture. At that time the motor will turn the locking shaft and lock the connector into the aperture of the locking unit.

The grooves in the connector and in the wall of the aperture of the locking unit are aligned in relation to the top of the locking unit. This alignment is confirmed by the activation switch. At this time, the electric motor rotates the locking shaft into the locked position with a cam on the shaft being moved to the groove in the connector in the locked position. This cam is jammed against the groove in the connector to prevent the withdrawal of the connector from the locking unit.

The controller is programmed in locking the locking shaft to turn the shaft 180 degrees or more as specified so that the cam is jammed against the groove in the connector and to measure the amount of time for the motor to turn the locking shaft the specified degrees and the amperage draw of the electric motor. The controller is programmed to reverse the motor to unlock the locking shaft if a specified time and amperage draw is not exceeded. It should be realized the controller can be programmed to just turn the shaft 180 degrees or more when the cam should be jammed against the groove in the connector to secure the connector to the locking unit. This can also be determined by measuring the amperage draw of the electric motor which at a specified level will indicate that the cam is jammed against the groove in the connector. Another method is by the controller being programmed to reverse the motor to unlock the locking shaft if the specified time is not exceeded. Preferably the controller will measure all three of these criteria and if the controller determines that the connector is not adequately locked, it will reverse the motor to turn the locking shaft to unlock it so that the connector can then be withdrawn and reinserted again when conditions warrant.

When the locking shaft has been turned to the locked position a safety pin will be inserted through an aperture in the end of the locking shaft to secure it from being accidentally unlocked This safety pin may be spring loaded so that it will be automatically inserted into the aperture of the locking shaft.

To unlock the connector from the locking unit, the safety pin can be pulled out and held out for a period of time, such as three seconds, which will activate a roller switch, which in turn activates the controller to unlock the locking shaft. Requiring that the safety pin be removed from the aperture of the locking shaft for a period of time prevents the accidental unlocking of the connector.

Additional safeguards against accidental unlocking of the connector which could be very dangerous, is that the controller can be electronically connected to the vehicle through the wiring of the vehicle and programmed to not permit the motor to unlock the locking shaft if the vehicle is not in a stationary position. It can be further programmed to not unlock the connector from the locking unit if the tow hitch connector is attached to a load. This can be determined by the controller being connected to the wiring going to the trailer or the load.

In order to jam the cam on the locking shaft into a tight connection between the connector and the locking aperture, the groove on the wall of the locking unit is larger than the groove on the connector. In this way the cam on the locking shaft will be jammed against the groove on the connector when in the locked position and located in the groove of the locking unit when unlocked.

All of these features of the invention discussed above contribute to the safety and ease of the operation of the tow hitch assembly.

BRIEF DESCRIPTION OF THE DRAWINGS

These and other features of this invention will become apparent from the following description of one embodiment where reference is made to the accompanying drawings.
In the drawing:

FIG. 2 is a cross-section of connector and locking unit separated from each other.

FIG. 3 is a cross-section of the locking unit and connector with the connector in the locked position.

FIG. 4 is a cross-section of FIG. 3 showing the safety pin in the locked position.

DETAILED DESCRIPTION OF THE PREFERRED EMBODIMENTS

Figure 1:
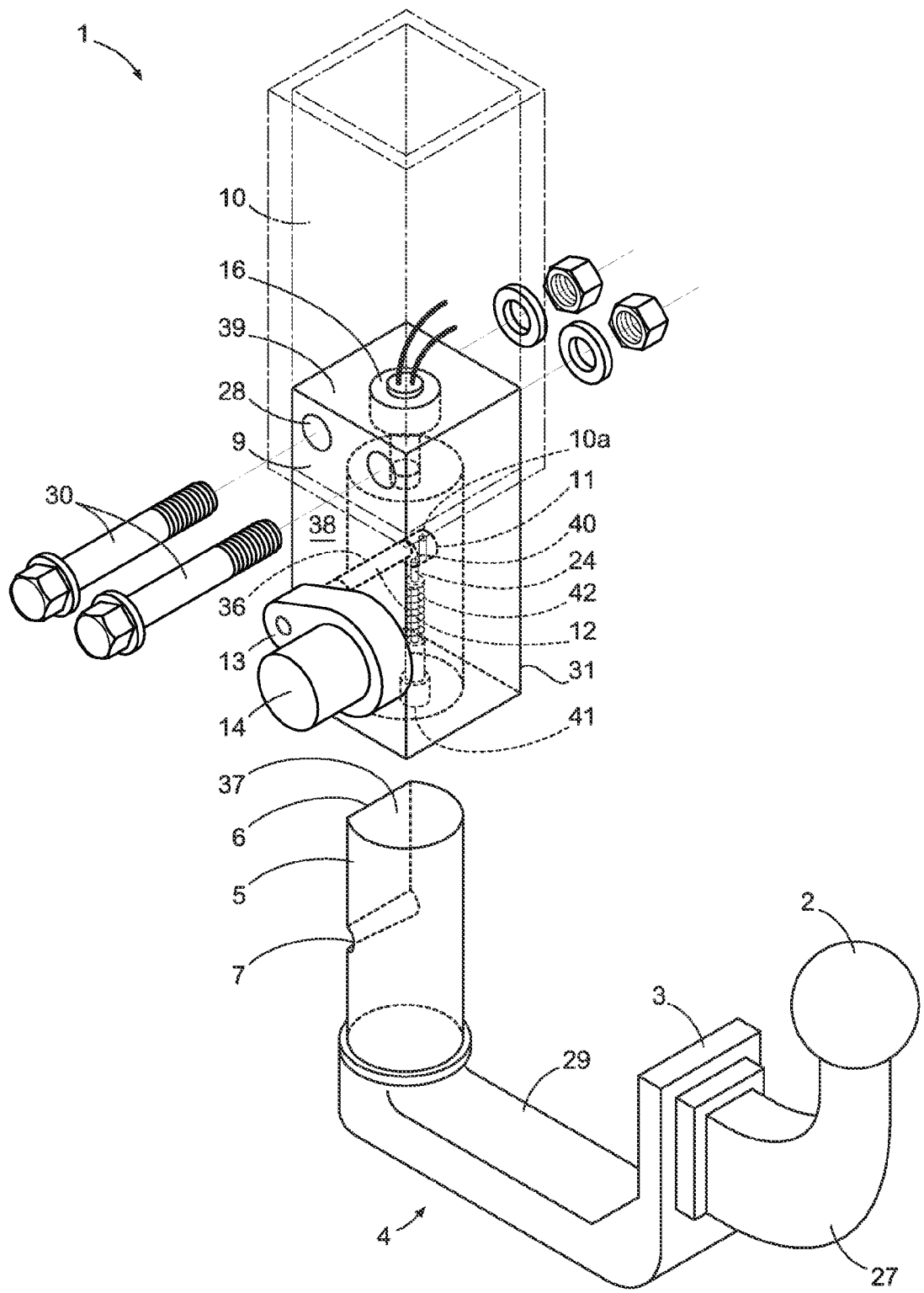
FIG. 1 is a perspective view of the separated components of the assembly; showing the operation of the locking pin and the eccentric section on the locking shaft.

Turning now descriptively to the drawings, in which similar reference characters denotes similar elements throughout the several views, the figures illustrate the present invention. With regard to the referenced numerals used the following numbering is used throughout the various drawing figures.

| | PARTS LIST | |
|---|---|---|
| 1. | | Tow Hitch Assembly |
| 2. | | Tow Hitch Ball |
| 3. | | Angled Face Plate |
| 4. | | Flange or Ball Mount |
| 5. | | Angled Connector |
| 6. | | Flattened Face |
| 7. | | Groove in Connector |
| 8. | | Safety Pin |
| 9. | | Locking Unit |
| 10. | | Harness |
| 10(a). | | Transverse Aperture in Locking Shaft |
| 11. | | Locking Shaft |
| 12. | | Eccentric Section of Locking Shaft |
| 13. | | Gearbox |
| 14. | | Electric Motor |
| 16. | | Activation Switch |
| 18. | | Receiving Aperture in Locking Unit |
| 20. | | Top of Locking Unit |
| 22. | | Roller Switch |
| 24. | | Shoulder of Safety Pin |
| 26. | | Sensor of Roller Switch |
| 27. | | Tow Hitch Holder |
| 28. | | Bolt Apertures |
| 29. | | Base |

| | -continued | |
|---|---|---|
| | PARTS LIST | |
| 30. | | Bolts |
| 33. | | Groove in Wall |
| 34. | | Wall |
| 35. | | Wall |
| 36. | | Cam on Eccentric Section of Locking Shaft |
| 37. | | Top of Connector |
| 38. | | Side of Locking Unit |
| 40. | | End of Safety Pin |
| 41. | | Knob |
| 42. | | Spring |

DETAILED DESCRIPTION OF THE INVENTION

As illustrated in FIG. 1 an electronic controlled tow hitch assembly (1) consists of the usual tow hitch ball (2) bolted to an angled face plate (3) forming one end of a flange (4). The other end of the flange (4) carries a connector (5) with a base (29) in between the ends of the flange.

The connector (5) is essentially a post with a circular cross section which has a flattened face (6) formed to extend from the free end or top of the post and terminating in a part-circular transverse groove (7) across the bottom of the face (6).

A safety pin (8) is mounted to the operatively bottom end of a locking unit (9) which is securely bolted to a harness (10) or hitch receiver which in turn is part of or bolted to the chassis of the towing vehicle (not shown). The safety pin (8) extends into the locking unit (9) and into an aperture (10a) provided for a rotatable locking shaft (11). The safety pin (8) is spring biased (42) or loaded to its inner position where its end may engage in a transverse aperture (10a) near the end of the locking shaft (11).

The locking shaft (11) has an eccentric section (12) partway along its length which forms a cam (36). This cam (36) engages in the transverse groove (7) in the connector (5). Rotation of the locking shaft (11) with its cam (36) causes the cam (36) to move in and out of the groove (7). This either locks or releases the connector (5) against or for movement in or from the locking unit (9).

The cam (36) effects secure locking of the tow hitch assembly (1) on rotation of shaft (11) in the groove (7) and engagement of the safety pin (8) in the aperture (10a) in the locking shaft (11) secures the shaft against rotation. This avoids play or movement between components of the tow hitch assembly (1) as is frequently found in tow hitch assemblies presently available. The dimensions of the cam (36) and the groove (7) in the connector (5) are such that an interference fit prevents complete rotation of the locking shaft (11). This jamming effect increases the power drawn by the electric motor (14) to move the cam (36) and its use is described below. The detected increase in power causes the motor to stop with firm engagement between the locking shaft (11) and the connector (5) and the monitoring program with the signal which will operate the safety pin (8) to engage the locking shaft (11). The jamming of the cam (36) in the groove (7) in the connector properly aligns the connector (5) in the locking unit (9) and also provides a tight fit to prevent rattling of the unit during movement of the vehicle. Once the connector (5) is properly locked in the locking unit (9) and the safety pin (8) has been inserted in the aperture (10a) in the locking shaft, the tow hitch is safe to use.

The operation for connection and release of the above tow hitch assembly (1) is effected through a gearbox (13) mounted on the side of the locking unit (9). The gearbox input shaft (not shown) is driven by a small electric motor (14). The motor is powered from the vehicle battery which may also energize a solenoid or other operating means for securing and withdrawing the safety pin (8). A separate battery for the tow hitch assembly could be provided for operating the locking and unlocking of the assembly.

The central processing unit (CPU) or controller (not shown) is provided and programmed to energize the electric motor (14) from the battery and the operating circuit in proper sequence for normal operation and includes safety measures to prevent operation unless all is in proper order for the release of the assembly at the proper time. These measures are described in further detail below.

The mechanical advantage afforded by the gearbox (13) enables a low power electric motor (14) to move the locking shaft (11) into a locked position. The release of the safety pin (8) through the solenoid or other device or manually connects the battery power to the motor (14) which will drive the locking shaft (11) and automatically release the tow hitch assembly (1). Sensors may be included in the circuitry to monitor the condition of the assembly before and after operation and energize alarms in the event of any malfunction of the components. This enables the position of the locking shaft (11) to permit signals to be generated to cease operation of the electric motor (14) in either direction to lock or release the locking shaft (11) or to activate suitable alarms. If the tow hitch assembly (1) is not in proper order for release or locking, the electric motor (14) will be deactivated and an alarm may be set off.

The electrical controls of the controller can be overridden by an override control (not shown) to allow the manual release of the flange or ball mount (4), such as by the manual movement of the safety pin (8). The tow hitch assembly (1) will then require manual operation and the motor will at all times be deactivated if the hitch is not properly assembled.

In somewhat more detail, when the connector (5) is inserted into the locking unit (9) an electrical circuit is activated that controls the electric motor (14). The electric motor (14) will rotate the locking shaft (11) inside the locking unit (9) causing the cam (36) to pull the connector (5) into firm engagement in the locking unit (9) and lock it. Once the flange (4) or ball mount has been locked in the operating position the electric circuit will detect this and deactivate the motor. The ball mount (4) can only be unlocked and removed by manually pulling the safety pin (8) at the bottom of the locking unit (9). This pin (8) will then activate the electric circuit which in turn activates the controller which directs the electric motor (14) to run in reverse and rotate the locking shaft (11) out of engagement with the connector (5) and the ball mount (4) will move freely from the locking unit (9). The electronic circuit will then stop the electric motor (14).

The central processing unit (CPU) or controller may be wired and programmed with sensors to ensure that the flange or ball mount (4) is safely secured in position before a trailer can be coupled to the hitch. Similarly the tow hitch assembly (1) should not be released if the towing vehicle is in motion. Operation of the electric motor (14) is controlled through monitoring of both power drawn from the battery and the direction of operation of the motor. Alarms against unauthorized or incorrect operation of the circuitry may also be included in the tow hitch assembly (1).

Essentially the electronic circuit has two triggers, one which is activated when the connector (5) is inserted in the locking unit (9) and one which is activated when the safety pin (8) is locked into position or is pulled out of the aperture (10a) of the locking shaft (11) permitting the connector (5) and flange (4) to be removed. Both of these triggers are used to establish reliable and safe working of the tow hitch assembly (1).

This electronic controlled tow hitch assembly (1) is controlled by a central processing unit (CPU) or controller which controls the electric motor (14). The controller is also electrically connected to an activation switch (16) at the top (20) of the receiving aperture (18) and to a roller switch (22). A sensor (26) on the roller switch (22) will come into contact with the shoulder (24) of the safety pin (8) when the safety pin (8) is manually pulled out by the operator past a certain position. As mentioned above, a solenoid or other means could be utilized by the operator to pull out the safety pin (8).

One of the safety controls against the accidental disconnection of the connector (5) from the locking unit (9) is the use of the roller switch (22) which is electrically connected to the controller. The roller switch (22) senses by coming into contact with the shoulder (24) of the safety pin (8) when the safety pin has been manually pulled out of position. The controller may be programmed so that the safety pin (8) has to be held out for a period of time, such as three seconds, before the controller will permit the electric motor (14) to reverse and turn the locking shaft (11) to the unlocked position. It should be understood that the safety pin (8) can be operated by a solenoid or other means to remove it from the transverse aperture (10a) in the locking shaft (11). Alternatively, a button or control can be provided which needs to be held in position for a determined number of seconds to make sure the command to unlock the locking shaft (11) is not accidental.

The central processing unit (CPU) or controller is designed to improve the safety of the electronic locking tow hitch assembly (1). The controller can be supplied by the power from the battery of the vehicle or could have its own source of power. The controller is connected by electrical wiring to the electric motor (14), the activation switch (16) and the roller switch (22). When the connector (5) is inserted into the receiving aperture (18), it is manually pushed to the top (20) of the locking unit (9) until the top of the connector (37) comes in contact with the activation switch (16). The activation switch (16) activates the controller which powers the electric motor (14) driving the gearbox (13) which will turn rotatable locking shaft (11) in the locking direction. The motor (14) will turn the locking shaft (11) so that the cam (36) is engaged in the groove (7) in the connector. The controller can be programmed to determine the amount of time it will take the electric motor (14) to turn the locking shaft (11) 180 degrees or more to the jammed position. The controller can also measure the amperage drawn by the electric motor (14) and determine in this way when the locking shaft (11) has reached a position where the cam (36) is jammed against the groove (7) in connector, at which time the electric motor (14) stops turning and the connector (5) is locked in the receiving aperture (18). The controller can determine the specific amperage draw of the electric motor (14) which indicates that the motor has turned the locking shaft (11) as far as it can and it is jammed into place. The controller can time the amount of time it takes the electric motor (14) to turn locking shaft (11) more than 180 degrees. If that amount of time is not exceeded before the motor starts encountering tension (as measured by the amperage draw) the controller will then reverse the electric motor (14) to return the locking shaft (11) to the fully unlocked position. Preferable the controller is programmed to determine the amount of time and amperage draw and degrees of turn of the locking shaft (11), as this will increase the safety of the tow hitch assembly (1). This could be due to dirt or mud being trapped inside groove (7) or groove (33) in the wall or due to wear and tear of the assembly.

By jamming the cam (36) into groove (7) in connector, any misalignment of the connector (5) in the receiving aperture (18) will be corrected. This jamming of the cam (36) into the groove (7) also results in the connector (5) being firmly secured in aperture (11) which reduces rattles and shaking of the assembly (1).

Once the locking shaft (11) is in the locked position the safety pin (8) locks the locking shaft (11) in place by the end (40) of the pin extending into aperture (10a). The safety pin (8) is preferably spring loaded so that the spring pushes the pin into the aperture (10a). Aperture (10a) is preferably oval in shape and somewhat larger in diameter than the diameter of the end of the safety pin (8) which permits the safety pin (8) to enter the aperture (10a) and lock the shaft (11) in proper position. Too small a tolerance might prevent the end (40) of safety pin (8) from entering the aperture (10a). Once the safety pin (8) is in place in aperture (10a), the roller switch (22) confirms to the controller that the safety pin (8) is in place. The roller switch (22) has a sensor (26) that comes into contact with the shoulder (24) of the safety pin (8) when it is in the locked position. The safety pin (8) prevents the cam (36) from becoming unlocked due to an electrical malfunction or the stripping of the gears in the gearbox (13). The controller may have a beeper to confirm that the tow hitch assembly (1) is ready for use.

It is preferable that there be a small tolerance between the cam (36) and the groove in connector (7) so that if the connector (5) is skewed off center it will be straightened into proper alignment by the turning of cam (36). In order to provide a tight fit between the connector (5) and the receiving aperture (18) the groove in the wall (33) of the locking unit (9) may be larger than the groove in the connector (7).

In disconnecting the ball mount (4) from the locking unit (9), the spring loaded safety pin (8) can be manually pulled out of aperture (10a). The pin has to be held out for a time (e.g. three to four seconds) before the controller permits current to supply the electric motor (14) to turn the locking shaft (11) in the reverse direction to unlock connector (5) from the locking unit (9). The sensor (26) on the roller switch (22) will convey that information to the controller. During that time, three conditions preferably must be met before the controller will permit electric current to be supplied to the electric motor (14) to disconnect the connector (5) from locking unit (9). These conditions are:

1. The vehicle is in a stationary position and not moving;
2. That the electrical wiring of the trailer (e.g. for lights) is not connected to a source of electric current; and
3. That the vehicle's emergency lights are flashing.

If those three conditions are not met then the controller preferably will not allow electric current to be delivered to the electric motor (14). The trailer wiring and wiring of the vehicle can be connected through the controller. Information that the vehicle is stationary can be conveyed by a connection to the brakes of the vehicle or by an accelerator chip. Some vehicles have a CANBus system which will signal the controller that the vehicle is stationary. The controller checks the light connector to the trailer to determine if any lights are present which indicates the trailer may be attached to the vehicle. The safety feature of checking to determine that the flashing lights are on indicates the operator has access to the vehicle.

It should be realized that this system could easily include other safety features because of the ability of the controller to be programmed. Once all of these conditions are met the controller will permit power to be supplied to the electric motor (14) to turn the locking shaft (11) in the reverse direction to disconnect connector (5) from locking unit (9). All of these checks in connecting and disconnecting connector (5) ensure safety in the operation of the electronic tow hitch assembly (1)

Different automobiles have different systems for controlling the electrical connection from the automobile to the trailer.

By requiring that three conditions be met before the flange or ball mount (4) can be disconnected from the locking unit (9), the safety of the tow hitch assembly (1) of this invention is greatly increased over current tow hitch assemblies. Auditory or visual indicators can be incorporated with the controller to alert the operator to the precise condition.

The controller may have a memory to keep track of the times the locking and unlocking of the tow hitch is performed and also of the failures in locking and unlocking. It may also keep track of faulty connection ejections of the connector (5) from the locking unit (9).

The tow hitch assembly (1) of this invention can be used for the mounting of a winch to move the vehicle or an object. The winch can be supplied with current through the controller. A bicycle rack can also be mounted on the ball mount (4) which would permit the rack and ball mount (4) to be removed together.

It should be emphasized that the above-described embodiments of the present disclosure are merely possible examples of implementations, merely set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, having thus described the invention, at least the following is claimed:

1. An electronically controlled tow hitch assembly for a vehicle comprising:
    a. a base with two ends, an angled face plate which is connected to one end of the base, a tow hitch holder shaped and configured for holding a load which is connected to the face plate, an angled connector with cylindrical sides which is connected at the other end of the base, said connector having a top remote from the connection with the base and having a flattened face extending from the top towards the base to a transverse groove;
    b. a locking unit shaped and configured to be securable to a vehicle, said locking unit having a top, bottom and sides with an aperture extending upward from the bottom which is shaped to receive and lock the cylindrical connector, the aperture having a cylindrical wall with a shaft passage between two sides of the locking unit and forming a groove across the cylindrical wall, with the groove being in alignment with the groove in the connector when the connector is in the locking position, the locking unit having a sensor for determining when the connector has been inserted far enough into the aperture for locking;
    c. a locking shaft with two ends which extends through the shaft passage and groove in the locking unit, the shaft having an eccentric section with a cam which can be rotated within the aligned grooves in the cylindrical wall of the locking unit and connector between a locked and unlocked position with the cam being in juxtaposition to the groove in the cylindrical wall in the unlocked position so as to allow the flattened face of the connector to be moved past the locking shaft in the inserting and withdrawal of the connector from the locking unit, with the cam being in juxtaposition to the groove in the connector in the locked position to prevent the connector from being withdrawn from the locking unit, the shaft having a gear on one end of the shaft, and a transverse aperture on the other end of shaft;

d. an electric motor and reduction gear assembly with the gear on the end of the shaft connecting to a gear in the gear assembly;

e. a safety pin secured to the locking unit for extending through the transverse aperture in the locking shaft when the connector is in the locked position, the safety pin having means for extending it into the locked position and means for removing it from the locked position; and f. means to control the electric motor to move the locking shaft between the locked and unlocked positions.

2. The electronically controlled tow hitch assembly of claim 1 in which the means to control the locking and unlocking of the assembly is a controller which is programmed in locking the locking shaft to turn the shaft 180 degrees or more so that the cam is jammed against the groove in the connector to align and secure the connector in the locking unit.

3. The electronically controlled tow hitch assembly of claim 1 in which the means to control the locking and unlocking of the assembly is a controller which is programmed in locking the locking shaft to turn the shaft until the amperage draw of the motor reaches a specified level indicating that the cam is jammed against the groove in the connector to align and secure the connector in the locking unit.

4. The electronically controlled tow hitch assembly of claim 1 in which the means to control the locking and unlocking of the assembly is a controller which is programmed in locking the locking shaft to turn the shaft 180 degrees or more as specified so that the cam is jammed against the groove in the connector and to measure the amount of time for the motor to turn the locking shaft the specified degrees, and to measure the amperage draw of the electric motor, and controller is programmed to reverse the motor to unlock the locking shaft if a specified time and amperage draw is not exceeded.

5. The electronically controlled tow hitch assembly of claim 2 in which the safety pin has an end and is spring loaded to push the end of the pin into the transverse aperture of the locking shaft which has a shape and size configured for easy insertion of the pin into the aperture by the spring during locking.

6. The electronically controlled tow hitch assembly of claim 2 in which the sensor for determining when the connector has been inserted far enough into the locking unit to lock being an activation switch located on the top of the locking unit, with the switch conveying the information that the connector has been inserted far enough to the controller which permits power to be transmitted to the electric motor for turning the locking shaft.

7. The electronically controlled tow hitch assembly of claim 5 in which locking unit has a roller switch which senses when the safety pin has been removed from the aperture in the locking shaft to unlock the connector and times the duration of the removal, said safety pin being configured to be removed manually by pulling and holding the safety pin out of the aperture for a specified time, and after the expiration of this time the controller is programmed to reverse the electric motor to turn the locking shaft to the unlocked position.

8. The electronically controlled tow hitch assembly of claim 4 in which the controller is further electronically connected to the vehicle and programmed to not permit the motor to unlock the locking shaft if the vehicle is not in a stationary position.

9. The electronically controlled tow hitch assembly of claim 4 in which the controller is further electronically connected to determine if the tow hitch connector is attached to a load and programmed to not permit the motor to unlock the locking shaft if the tow hitch connector is attached to a load.

10. The electronically controlled tow hitch assembly of claim 4 in which the controller is further electronically connected to the vehicle and programmed to not permit the motor to unlock the locking shaft if the vehicle is not in a stationary position, with the controller further electronically connected to determine if the tow hitch connector is attached to a load and programmed to not permit the motor to unlock the locking shaft if the tow hitch connector is attached to a load.

11. The electronically controlled tow hitch assembly of claim 1 in which the groove in the cylindrical wall of the locking unit is larger than the groove in the connector in order to accommodate the cam of the locking shaft when it is in the unlocked position.

12. An electronically controlled tow hitch assembly for a vehicle comprising:

a. a base with two ends, an angled face plate which is connected to one end of the base, a tow hitch holder shaped and configured for holding a load which is connected to the face plate, an angled connector with cylindrical sides which is connected at the other end of the base, said connector having a top remote from the connection with the base and having a flattened face extending from the top towards the base to a transverse groove;

b. a locking unit shaped and configured to be securable to a vehicle, said locking unit having a top, bottom and sides with an aperture extending upward from the bottom which is shaped to receive and lock the cylindrical connector, the aperture having a cylindrical wall with a shaft passage between two sides and forming a groove across the cylindrical wall, with the groove being in alignment with the groove in the connector when the connector is in the locking position, the locking unit having an activation switch on the top of the locking unit for determining when the connector has been inserted far enough into the aperture for locking;

c. a locking shaft with two ends which extends through the shaft passage and groove in the locking unit, the shaft having an eccentric section with a cam which can be rotated within the aligned grooves in the cylindrical wall of the locking unit and connector between a locked and unlocked position with the cam being in juxtaposition to the groove in the cylindrical wall in the unlocked position so as to allow the flattened face of the connector to be moved past the locking shaft in the inserting and withdrawal of the connector from the locking unit, with the cam being in juxtaposition to the groove in the connector in the locked position to prevent the connector from being withdrawn from the locking unit, the shaft having a gear on one end of the shaft, and a transverse aperture on the other end of shaft;

d. an electric motor and reduction gear assembly with the gear on the end of the locking shaft connecting to a gear in the gear assembly;

e. a safety pin secured to the locking unit and having an end for extending through the transverse aperture in the locking shaft which has a shape and size configured for easy insertion of the pin during locking, the safety pin being spring loaded to push the end of the pin into the aperture of the locking shaft, the safety pin being configured for manual removal from the aperture to unlock the locking shaft, and having roller switch for determining when the safety pin has been removed from the aperture; and f. a controller to control the locking and unlocking of the assembly, the activation switch being activated when the connector has been inserted to a specified location into the locking unit with the switch conveying the information to the controller which permits power to be transmitted to the electric motor to turn the locking shaft into the locking position, the controller being programmed to turn the locking shaft 180 degrees or more as specified so that the cam is jammed against the groove in the connector and to measure the amount of time for the motor to turn the locking shaft the specified degrees, and to measure the amperage draw of the electric motor, and controller is programmed to reverse the motor to unlock the locking shaft if a specified time and amperage draw is not exceeded, with the controller receiving information from the roller switch that the safety pin has been removed from the aperture of the locking shaft and controlling the electric motor to unlock the locking shaft to permit removal of the connector from the locking unit.

13. The electronically controlled tow hitch assembly of claim 12 in which the groove in the cylindrical wall of the locking unit is larger than the groove in the connector in order to accommodate the cam of the locking shaft when it is in the unlocked position.

14. An electronically controlled tow hitch assembly for a vehicle comprising a harness and a flange, the harness is shaped and configured to be securable to a vehicle, the flange is shaped and configured for holding or towing a load, the harness includes a locking unit with an aperture formed by walls, the locking unit having a shaft passage that extends across a wall of the aperture forming a groove in the wall, and the flange includes a connector that has a complementary shape to the aperture in the locking unit and is receivable in the aperture, the connector having a groove that is in alignment with the groove in the wall of the aperture when the connector is locked in the aperture in the locking unit, the connector having a top with a recessed face extending from the top to the groove, the connector is securable by a locking shaft which extends through the shaft passage and the groove in the wall of the locking unit, the shaft having an eccentric section with a cam which can be rotated within the aligned grooves in the wall and the connector between a locked and unlocked position with the cam being in juxtaposition to the groove in the wall in the unlocked position so as to allow the recessed face of the connector to be moved past the locking shaft in the inserting and withdrawal of the connector from the locking unit, with the cam being in juxtaposition to the groove in the connector in the locked position to prevent the connector from being withdrawn from the locking unit, the tow assembly having electronically controlled means to rotate the locking shaft between the locked and unlocked positions.

15. An electronically controlled tow hitch assembly of claim 14 in which the locking shaft has two ends with a gear on one end and the means to rotate the locking shaft between the locked and unlocked position is an electric motor and reduction gear assembly with the gear on the end of the shaft connected to a gear in the gear assembly which is controlled by a controller.

16. An electronically controlled tow hitch assembly of claim 15 in which the controller is programmed in locking the locking shaft to turn the shaft 180 degrees or more so that the cam is jammed against the groove in the connector to align and secure the connector in the locking unit.

17. The electronically controlled tow hitch assembly of claim 15 in which the controller is programmed in locking the locking shaft to turn the shaft 180 degrees or more as specified so that the cam is jammed against the groove in the connector and to measure the amount of time for the motor to turn the locking shaft the specified degrees, and to measure the amperage draw of the electric motor, and controller is programmed to reverse the motor to unlock the locking shaft if a specified time is not exceeded before the motor reaches a specified amperage draw.

18. The electronically controlled tow hitch assembly of claim 15 in which the locking shaft has a transverse aperture on the other end of the shaft, and a safety pin secured to the locking unit for extending through the transverse aperture in the shaft when the connector is in the locked position, the safety pin having means for extending it into the locked position and means for removing it from the locked position.

19. The electronically controlled tow hitch assembly of claim 18 in which the safety pin has an end for extending through the transverse aperture in the locking shaft which has a shape and size configured for easy insertion of pin during locking, the means for extending the safety pin into the locked position is a spring to push the end of the pin into the aperture of the locking shaft, and the means for the removal from the aperture is the configuration of the safety pin for manual removal from the aperture to unlock the locking shaft.

20. The electronically controlled tow hitch assembly of claim 18 in which locking unit has a roller switch which senses when the safety pin has been removed from the aperture in the locking shaft to unlock the connector and times the duration of the removal, said safety pin being configured to be removed manually by pulling and holding the safety pin out of the aperture for a specified time, and after the expiration of this time the controller is programmed to reverse the electric motor to turn the locking shaft to the unlocked position.

* * * * *